(12) United States Patent
Derk et al.

(10) Patent No.: US 9,684,567 B2
(45) Date of Patent: Jun. 20, 2017

(54) HYPERVISOR AGNOSTIC INTERCHANGEABLE BACKUP RECOVERY AND FILE LEVEL RECOVERY FROM VIRTUAL DISKS

(71) Applicant: International Business Machines Corporation, Armonk, NY (US)

(72) Inventors: David G. Derk, Gibsonia, PA (US); Robert C. Edwards, Jr., Susquehanna, PA (US); Michael S. Fruchtman, San Jose, CA (US); Avishai H. Hochberg, San Jose, CA (US); Vadzim L. Piletski, San Jose, CA (US); Delbert B. Hoobler, III, Horseheads, NY (US); James P. Smith, Redwood City, CA (US)

(73) Assignee: International Business Machines Corporation, Armonk, NY (US)

(*) Notice: Subject to any disclaimer, the term of this patent is extended or adjusted under 35 U.S.C. 154(b) by 234 days.

(21) Appl. No.: 14/477,755

(22) Filed: Sep. 4, 2014

(65) Prior Publication Data
US 2016/0070623 A1    Mar. 10, 2016

(51) Int. Cl.
*G06F 11/14*    (2006.01)

(52) U.S. Cl.
CPC ...... *G06F 11/1469* (2013.01); *G06F 11/1451* (2013.01); *G06F 2201/815* (2013.01); *G06F 2201/84* (2013.01)

(58) Field of Classification Search
CPC ...... G06F 3/0605; G06F 3/067; G06F 3/0635; G06F 3/0643; G06F 3/0659
See application file for complete search history.

(56) References Cited

U.S. PATENT DOCUMENTS

| | | | |
|---|---|---|---|
| 9,311,375 B1* | 4/2016 | Naik | G06F 17/30575 |
| 2010/0162239 A1* | 6/2010 | Wires | G06F 17/30067 718/1 |
| 2011/0047340 A1* | 2/2011 | Olson | G06F 11/1456 711/162 |

(Continued)

OTHER PUBLICATIONS

IBM, "Data Protection for VMware User's Guide", dated Dec. 2013, Tivoli Storage Manager for Virtual Environments, Version 7.1 Data, Total 220 pages.

(Continued)

*Primary Examiner* — Jigar Patel
(74) *Attorney, Agent, or Firm* — David W. Victor; Konrad, Raynes, Davda and Victor LLP

(57) ABSTRACT

Provided are a computer program product, system, and method for hypervisor agnostic interchangeable backup recovery and file level recovery from virtual disks. Data is stored for a first virtual disk that represents data in a first format and metadata for the first virtual disk in a common data format in a storage having a fixed block length. A virtual disk file represents data in a second format that allows variable size blocks. Multiple instances of the fixed block length of blocks of data for the second virtual disk indicated in the virtual disk file are read. Each instance of the read fixed block length of blocks is written to the storage in the common data format with metadata describing the format of the blocks in the second virtual disk, and can be restored to a third virtual disk in the first or second format.

22 Claims, 6 Drawing Sheets

(56) References Cited

U.S. PATENT DOCUMENTS

2011/0252208 A1   10/2011  Ali et al.
2013/0311789 A1*  11/2013  Johnson .............. G06F 12/1408
                                                        713/193
2014/0006858 A1    1/2014  Helfman et al.

OTHER PUBLICATIONS

IBM, "Tivoli Storage Manager for Virtual Environments: Data Protection for VMware Solution Design Considerations", dated May 13, 2014, IBM Redbooks Solution Guide, Total 15 pages.
Microsoft Corporation, "VHDX Format Specification", dated Aug. 25, 2012, Version 1.00, Total 37 pages.
"Changed Block Tracking (CBT) on Virtual Machines (1020128)", (online) retrieved from the Internet on Aug. 22, 2014 at URL>http://kb.vmware.com/selfservice/microsites/search.do?language=en_U . . . , Total 2 pages.

\* cited by examiner

Backup Information

Virtual Disk File

HYPERVISOR AGNOSTIC INTERCHANGEABLE BACKUP RECOVERY AND FILE LEVEL RECOVERY FROM VIRTUAL DISKS

BACKGROUND OF THE INVENTION

1. Field of the Invention

The present invention relates to a computer program product, system, and method for hypervisor agnostic interchangeable backup recovery and file level recovery from virtual disks.

2. Description of the Related Art

In a virtual machine environment, a hypervisor creates and runs multiple virtual machines. Virtual machines may access data in one or more virtual disks, which provide a virtual representation of physical storage devices. A backup program may backup the virtual disk. IBM® Tivoli® Storage Manager "(TSM" for Virtual Environments (referred to as Data Protection for VMware®) offloads the backup workloads from the system hosting the virtual machines to a virtual storage (vStorage) backup server. A Tivoli Storage Manager backup-archive client (installed on the vStorage backup server) may perform complete full, incremental, and incremental forever snapshots of the virtual machines. The Tivoli Storage Manager may normalize the storage of the data by storing in a format independent of the original source data for the virtual disk, known as a common data format.

By normalizing the way that the data is stored and managed, i.e., storing it in a format that is independent of the original source data, many levels of service can be offered, such as restoring individual files from an image of a virtual machine, recovering data that originally resided in a traditional physical environment into a virtual machine or vice versa, etc. The TSM utilizes a "common data format" which normalizes data from physical volumes and from VMware virtual machines to realize some of these use cases, especially restoring individual files from an image of a VMware virtual machine. (TIVOLI and IBM are registered trademarks of International Business Machines Corporation throughout the world; VMWARE is a registered trademark of VMWARE Inc. throughout the world)

The TSM system may also reduce the amount of data needed to represent a backup version by utilizing change block tracking (CBT) technology that provides only data that has changed between backups to create backup versions. TSM uses the change block tracking mechanism to produce an "incremental forever" backup which only requires that a full backup is taken initially (i.e., all blocks currently used by the virtual machine) and afterwards can rely on incremental backups to represent backup versions. TSM manages the blocks that are incrementally captured to produce multiple recovery points of the entire virtual machine to the end-user. In summary, backups are optimized through incremental forever backup and by storing data in a common data format, the backups can be used either for recovery of an entire virtual machine or for individual files.

SUMMARY

Provided are a computer program product, system, and method for hypervisor agnostic interchangeable backup recovery and file level recovery from virtual disks. Data is stored for a first virtual disk that represents data in a first format and metadata for the first virtual disk in a common data format in a storage, wherein the common data format stores blocks of data having a fixed block length. A virtual disk file representing a second virtual disk is processed, wherein the virtual disk file represents data in a second format that allows variable size blocks, wherein the second format is different from the first format used to represent the data for the first virtual disk and different from the common data format. Multiple instances of the fixed block length of blocks of data for the second virtual disk indicated in the virtual disk file are read. For each instance of the fixed block length of blocks read, the instance of the read fixed block length of blocks is written to the storage in the common data format with metadata describing the format of the blocks in the second virtual disk. The blocks in the common data format in the storage stored from the first virtual disk are restored to a third virtual disk in the first or second format.

DETAILED DESCRIPTION

The current TSM solutions allow for backing-up of virtual disks in a VMWARE format to a common data format through the use of the change block tracking database to track changes to tracks in the virtual disk. One challenge is extending the common data format of TSM to different types of virtual machine environments, such as the Microsoft HYPER-V® virtual machine. (HYPER-V and MICROSOFT are registered trademarks of Microsoft Corporation throughout the world). The HYPER-V virtual machine data is in a variable data format that represents the layout and structure of data in virtual disk files. However, HYPER-V does not provide application programming interfaces (APIs) to allow ready access to the changed block extents from heterogeneous virtual machine backup programs.

In order to incorporate different types of virtual machine environments into a common data format for storing virtual disk data and incrementally changed data, described embodiments provide techniques for parsing and processing a virtual disk file, such as those files used in the Microsoft HYPER-V, that allows the layout of the virtual disk to be in variable block sizes. The virtual disk file is processed to read multiple instances of fixed block length of blocks of data. Multiple instances of the fixed block length of blocks of data are read for the second virtual disk indicated in the virtual disk file. For each instance of the fixed block length of blocks read using the virtual disk file, the instance of the read fixed block length of blocks is written to the storage in the common data format with metadata describing the format of the blocks in the second virtual disk. The blocks in the common data format backed-up from the second virtual disk may then be restored to a virtual disk in the first format or the second format that allows for variable sized blocks.

Figure 1:
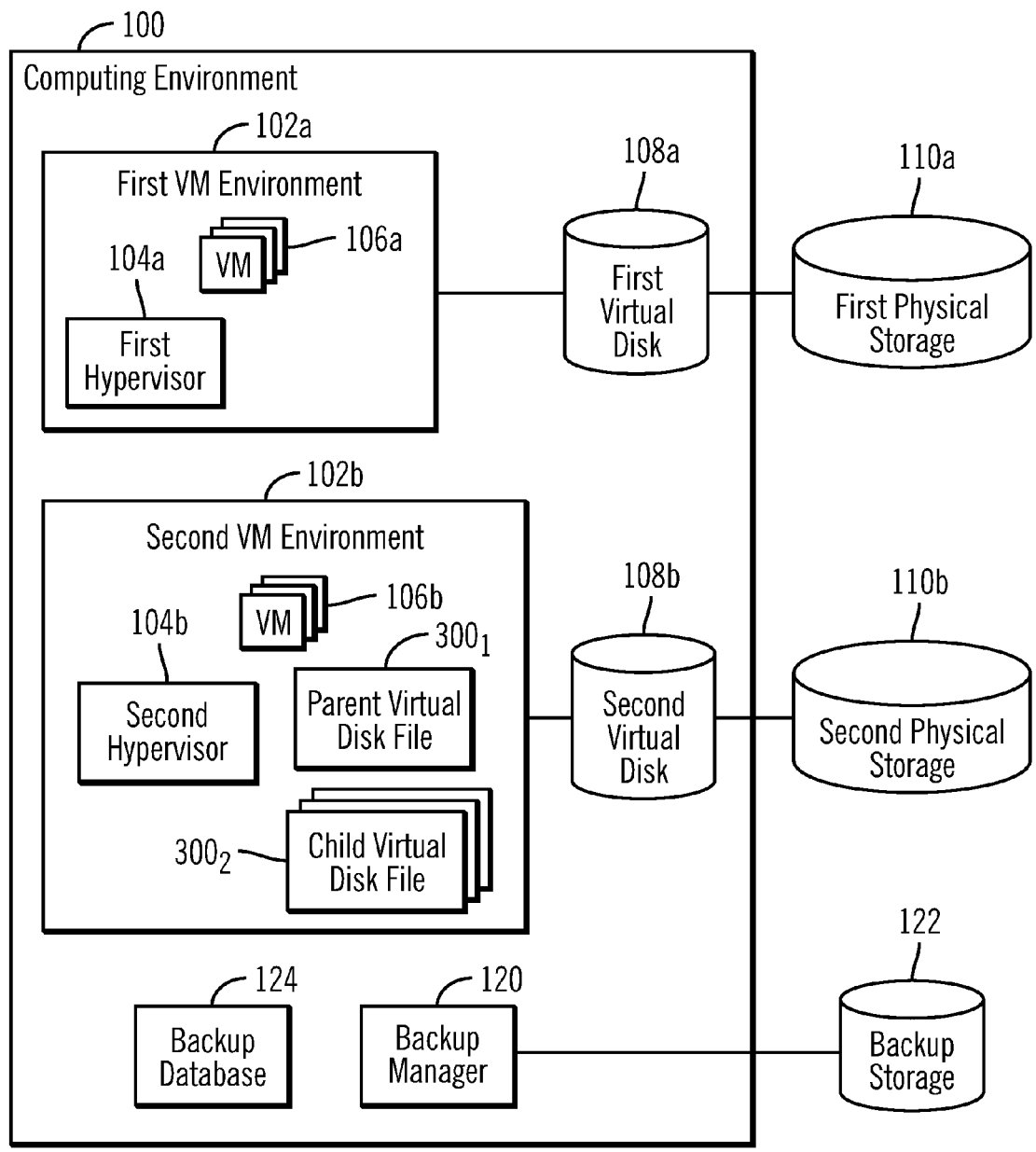
FIG. 1 illustrates an embodiment of a virtual machine computing environment.

FIG. 1 illustrates an embodiment of a virtual machine computing environment 100 having multiple virtual machine ("VM") environments 102a, 102b. Each virtual machine environment 102a, 102b includes a hypervisor 104a, 104b that creates, runs and manages one or more virtual machines VMs 106a, 106b generated in the computing environment 100. Each of the VM environments 102a, 102b includes one or more virtual disks 108a, 108b that are accessed by one or more of the virtual machines 106a, 106b. The virtual disks 108a, 108b provide a representation of data that is stored in physical storage devices 110a, 110b. In one embodiment, the virtual disks 108a, 108b use different formats, such as a first format and second format to represent data in the virtual disks, such as the case of a VMWARE virtual disk format and a HYPER-V virtual disk format.

In one embodiment, the first VM environment 102a may utilize a hypervisor 104a that uses a changed block tracking ("CBT") mechanism to provide data in fixed block length blocks to store, which is compatible with the common data format, such as VMWARE.

In one embodiment, the second VM environment 102b may represent the data stored in the virtual disk 108b using a parent virtual disk file 300 and one or more child virtual disk files $300_2$ having differential data that has changed in response to a user creating an incremental backup, such as a snapshot operation at different points-in-time from when the parent virtual disk file $300_1$ was created. The virtual disk files $300_1$, $300_2$ indicate a size of the blocks as defined by the user and other metadata on the layout of the blocks in the virtual disk 108b. In one embodiment, the second hypervisor 102b may comprise the Microsoft HYPER-V® product and the virtual disk files $300_1$, $300_2$ may be in the virtual hard disk format ("VHDX") utilized by HYPER-V. The child virtual disk files 400 may comprise a differencing virtual hard disk ("AVDX") used to represent changed data in the virtual disk represented by the VHDX file at different points-in-time.

The computing environment 100 may further include a backup manager 120 to manage the backing up of the data for the virtual disks 108a, 108b in a backup storage 122. The backup manager 120 maintains a backup database 124 having information on the backed-up virtual disks 108a, 108b. In one embodiment, the backup manager 120 stores data from the virtual disks 108a, 108b in a normalized data format, known as the common data format, which stores data in a fixed block length blocks, such as 16 KB. The backup manager 120 may receive data to backup from the first VM environment 102a in the common data format. In one embodiment, when the first virtual disk 108a is backed-up, after all data in the initial backup is stored, the further backups are incremental backups of only changed data. The first backup environment 102a, such as the first hypervisor 104a may implement an incremental forever backup strategy where after the initial backup of the data for the virtual disk 108a, an ongoing sequence of incremental backups occurs where only data that has changed since a last backup is provided to the backup manager 120 in the common data format to store in the backup storage 122. The first VM environment 102a may maintain common block tracking technology (CBT) to track data that has changed.

The computing environment 100 in which the VM environments 102a, 102b, virtual disks 108a, 108b, and backup manager 120 are implemented may comprise one or more servers that may communicate over a network, such as a Storage Area Network (SAN), Local Area Network (LAN), Intranet, the Internet, Wide Area Network (WAN), peer-to-peer network, wireless network, arbitrated loop network, etc. The storages 110a, 110b, and 122 may each be implemented in one or more storage devices, or an array of storage devices configured as Just a Bunch of Disks (JBOD), Direct Access Storage Device (DASD), Redundant Array of Independent Disks (RAID) array, virtualization device, tape storage, flash memory, etc. The storage devices in which the storages 110a, 110b, 122 are implemented may comprise hard disk drives, solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

Figure 2:
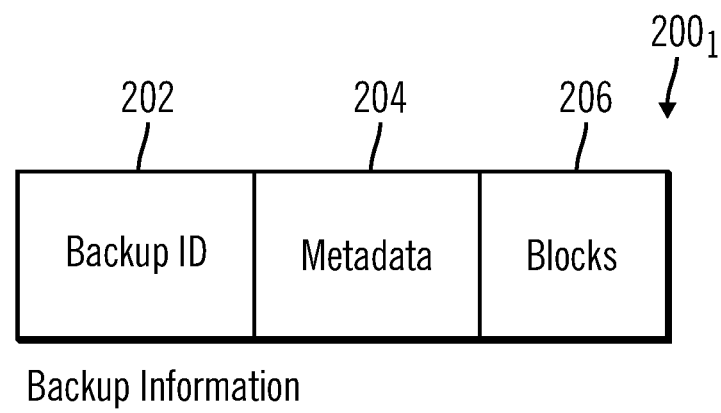
FIG. 2 illustrates an embodiment of backup information.
Figure 3:
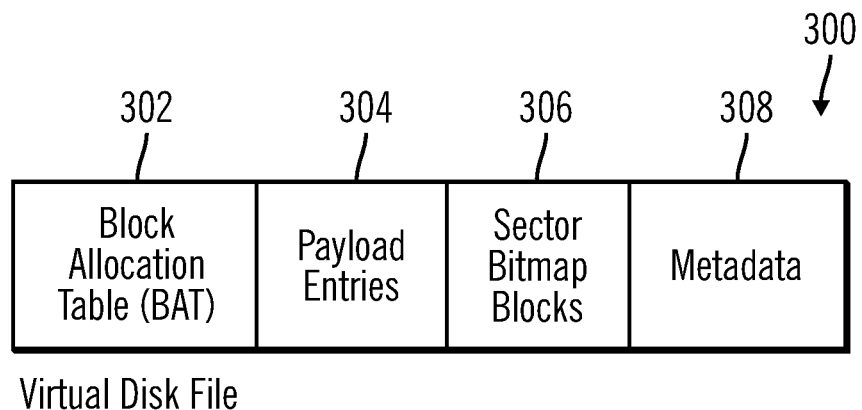
FIG. 3 illustrates an embodiment of a format of a virtual disk file.

FIG. 2 illustrates an embodiment of an instance of backup information 200, the backup manager 120 maintains in the backup database 122 for each backed-up virtual disk 108a, 108b. Each instance of backup information 200, includes a backup identifier (ID) 202 and metadata 204 for the backed-up virtual disk 108a, 108b, such as file system structures, e.g., directories and files, a layout of the blocks on the virtual disk, point-in-time information of the data. The metadata 204 contains sufficient information on the storage structure of the virtual disk 108a, 108b from which the data is backed-up to allow a virtual disk to be recreated from the data stored in the common data format in the backup storage 124. The backup information 200 further includes block information 206 having information on the bocks 206 that are backed-up in the storage 124 in the common data format, FIG. 3 illustrates an embodiment of the virtual disk file 300, such as the virtual disk files $300_1$, $300_2$, as including a block allocation table ("BAT") 302 that specifies the state and physical file offset for each block; payload entries 304 indicating whether the payload block represented by a payload entry 304 is present; and sector bitmap blocks 306 indicating whether a bitmap is provided for the sector or corresponding payload block, where the bitmap indicates blocks in the corresponding payload entry 304 having data. For a child virtual disk file $300_2$, the virtual disk file includes information indicating the parent virtual disk file including the data for a previous point-in-time, where the indicated parent can comprise the initial parent in the chain or an immediately preceding incremental backup. For a child virtual disk file providing incremental changes, the sector bitmap blocks 306 indicate whether a bitmap is provided for a payload block, where the bitmap indicates which blocks in the corresponding payload block 304 have changed data. The virtual disk file 300 further includes metadata 308 indicating further information on the virtual disk. Further, a sector bitmap for a payload entry 304 may have a value of one indicating that valid data is present in a payload block, and a value of zero indicating that data must be read from the parent virtual file $300_1$.

Figure 4:
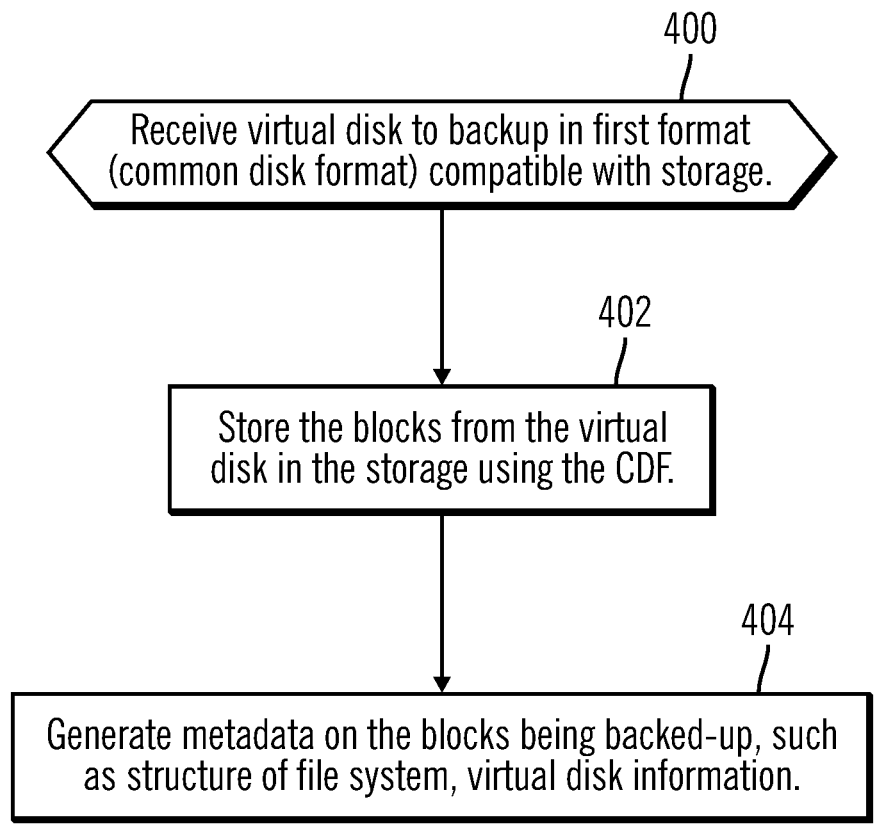
FIG. 4 illustrates an embodiment of operations to backup a virtual disk in a first format.

FIG. 4 illustrates an embodiment of operations performed by the backup manager 120 to backup data for a virtual disk 102a provided in the common data format. Upon receiving (at block 400) blocks to backup from the virtual disk 108a in the common data format, the storage manager 120 stores (at block 402) the blocks from the virtual disk in the storage in the common data format ("CDF"). The storage manager 120 generates (at block 404) metadata on the blocks being backed-up, such as structure of the file system and files in the virtual disk 102a being backed-up, virtual disk information, etc, to store in the metadata 204. The blocks provided for the virtual disk 108a may be from the initial backup or blocks changed since a previous point-in-time incremental backup, such as occurs as part of a snapshot or point-in-time backup.

Figure 5:
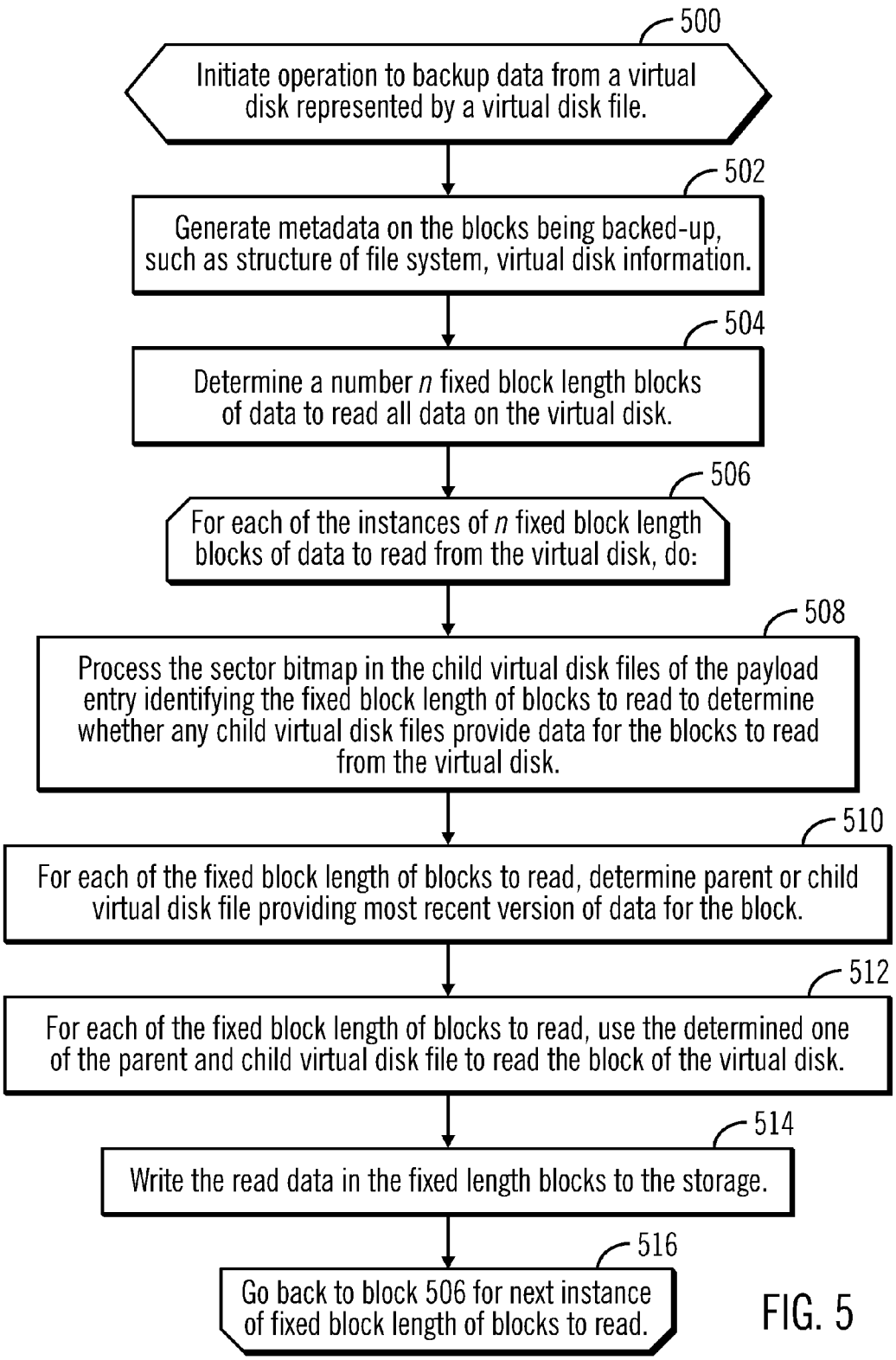
FIG. 5 illustrates an embodiment of operations to backup data from a virtual disk in a second format.

FIG. 5 illustrates an embodiment of operations performed by the backup manager 120 to store data for a virtual disk 108b represented by a virtual disk file 300. Upon initiating (at block 500) an operation to backup data from a virtual disk 108b represented by a virtual disk file 300, the backup manager 120 generates (at block 502) metadata on the blocks being backed, such as a structure of the file system, virtual disk information, etc., to store as metadata 204 in the backup information 200, to generate for the virtual disk 108b being backed-up. The backup manager 120 determines (at block 504) a number n fixed block length (e.g., 16 KB) blocks of data required to read all the data on the virtual disk 108b. For instance, the backup manager 120 may process the parent $300_1$ and any child $300_2$ virtual disk files to determine the block layout in the virtual disk 108b, and then determine a mapping of fixed length blocks for the common data format, e.g., 16 KB, to the blocks in the second format on the virtual disk 108b, which may be in a variable length from 512 KB to 4096 KB for HYPER-V implementations of the virtual disk 102b. The backup manager 120 performs a loop of operations at blocks 506 through 514 for each of instance of the n fixed block length blocks of data to read from the virtual disk 108b.

At block 508, if there are child virtual disk files $300_2$ for the virtual disk 108b to backup, the backup manager 120 processes the sector block bitmap 306 for the payload entry 304 in the child virtual disk files $300_2$ having the fixed block length of blocks to read to determine whether any child virtual disk files $300_2$ provide data for the blocks to read from the virtual disk. For each of the fixed block length of blocks to read, the backup manager 120 determines (at block 510) the parent $300_1$ or child $300_2$ virtual disk file providing a most recent version of data for the block. For each of the fixed block length of blocks to read, the backup manager 120 uses (at block 512) the determined one of the parent $300_1$ and child $300_2$ virtual disk files to read the block of the virtual disk. In one embodiment, the backup manager 120 may issue multiple reads to read blocks of the fixed block length using the information from different virtual disk files $300_1$, $300_2$. After reading the fixed block length of blocks, the backup manager 120 writes (at block 514) the read data to the backup storage 124. Control then proceeds (at block 516) back to block 506 if there are further fixed block length of blocks to read from the virtual disk 108b.

In one embodiment, to read the fixed block length of data using different virtual disk files $300_1$, $300_2$, the backup manager 120 may uses the parent $300_1$ and one or more child $300_2$ virtual disk files to access the data blocks to read. In a further embodiment, the backup manager 120 may use a MICROSOFT® WINDOWS® mechanism to present the HYPER-V® virtual disk 102b as a disk device and make direct reads to the disk device. In either case, raw data is read from the underlying second physical storage 110b. (MICROSOFT, HYPER-V, and WINDOWS are registered trademarks of Microsoft Corporation throughout the world). The backup manager 120 may issue multiple read requests to read blocks identified in both the parent $300_1$ and child $300_2$ virtual disk files. For instance, for a 16 KB read from both child and parent files, assuming a 4096 byte logical block size, the read for the 16 KB fixed block length block may require two reads: one 12 KB of changed data using the child AVHDX file $300_2$ and 4 KB of unchanged data from the parent VHDX file $300_1$.

The result of the operations of FIG. 5 is the backing-up of a virtual disk 108b having data in a variable length format represented in one or more one or more virtual disk files $300_1$, $300_2$ to a fixed block length consistent with a common data format used by the backup manager 120.

Figure 6:
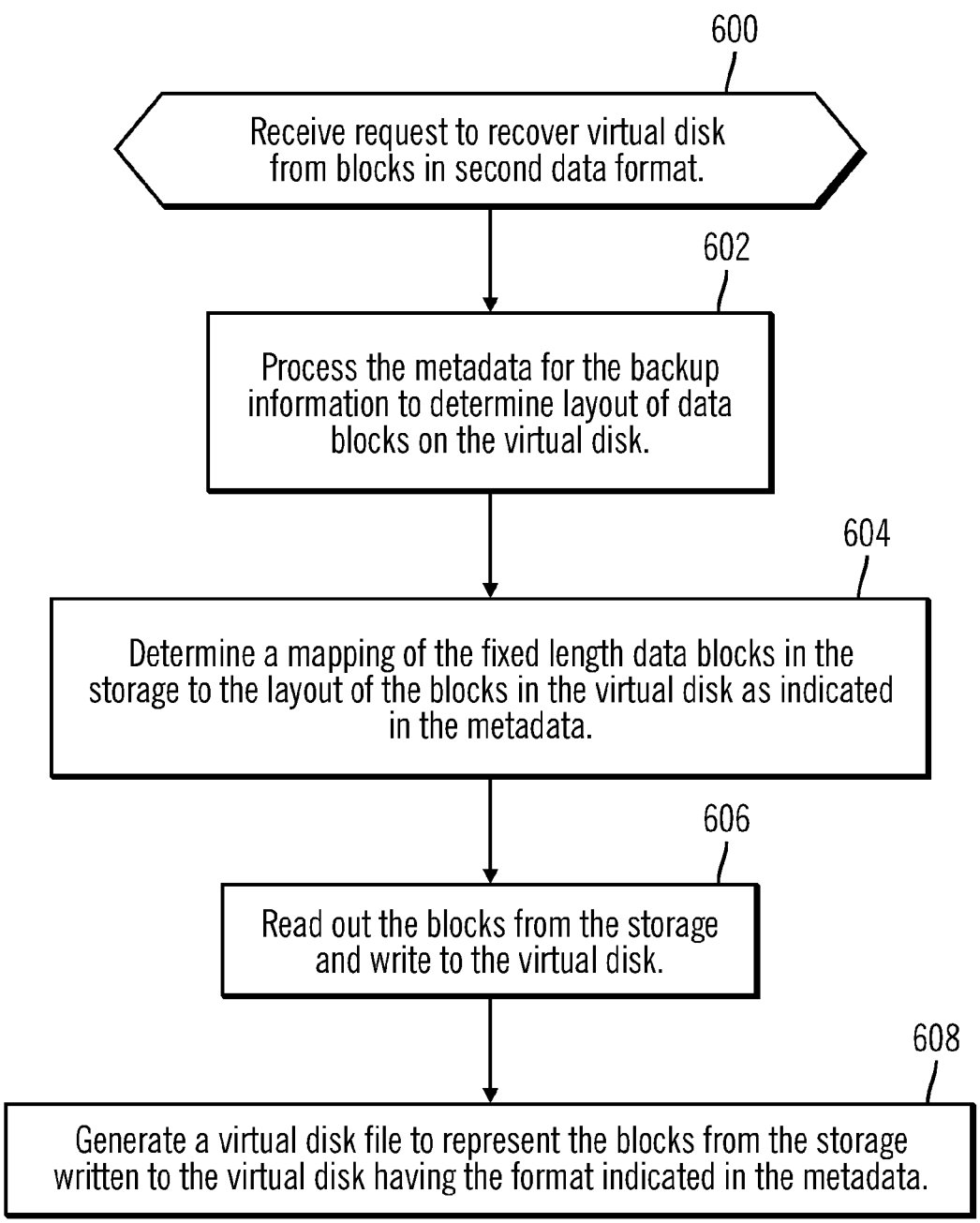
FIG. 6 illustrates an embodiment of operation to restore stored blocks in a backup storage to a virtual disk.

FIG. 6 illustrates an embodiment of operations performed by the backup manager 120 to recover a virtual disk in the second data format, i.e., the format requiring the use of the virtual disk files 300, from the blocks for a virtual disk stored in the backup storage 122 in the common data format. The backup manager 120 processes (at block 602) the backup information 200, for the data to restore to determine the layout of the data blocks on the virtual disk 102b to restore. The backup manager 120 then determines (at block 604) a mapping of the fixed length data blocks in the storage 122 in the common data format to the layout of the blocks in the virtual disk as indicated in the metadata 204. The layout of blocks for the virtual disk 102b to restore may differ from the layout of the blocks in the backup storage 122, which are in the common data format. The backup manager 120 reads (at block 606) out the blocks from the storage and writes the read blocks to the virtual disk 102b, which would involve writing the blocks to the second physical storage 110b. The backup manager 120 further generates (at block 608) a virtual disk file 300 to represent the blocks from the storage written to the new virtual disk 102b having the format indicated in the metadata for the virtual disk.

FIG. 6 is described with respect to recovering a virtual disk in the second data format which requires a virtual disk file 300, such as a recovery to a MICROSOFT HYPER-V virtual disk. However, if the user wants to recover the data for the virtual disk to a format other than HYPER-V, such as a VMWARE compatible format, then the virtual disk file 300 would not be created, and other VMWARE related metadata for the virtual disk 102a being recreated would be generated at block 608.

With the described embodiments of FIG. 6, data backed-up from a virtual disk 102a, 102b in different virtual machine environments 102a, 102b, e.g., WMWARE, HYPER-V, may be restored to a different virtual disk format because the data blocks are stored in a normalized form. Thus, data backed-up from a HYPER-V virtual disk, e.g., the second format, may be restored to a VMWARE virtual disk, e.g., first format, or a HYPER-V format, e.g., second format. Likewise, data backed up from a VMWARE virtual disk, e.g., first format, may be restored to either the VMWARE virtual disk, e.g., first format, or a HYPER-V virtual disk, e.g., second format.

Described embodiments provide techniques for backing up and restoring virtual disks that utilize different virtual disk formats, such as different hypervisors 104a, 104b, e.g., VMWARE versus HYPER-V. Although two different hypervisor environments are mentioned, VMWARE and HYPER-V, the described embodiments may be hypervisor product agnostic and used with other virtual machine environments that have different virtual disk formats and require conversion to store the data from the virtual disk in a normalized common data format, such as the CITRIX® XENSERVER® virtualization platform and other virtualization products and platforms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
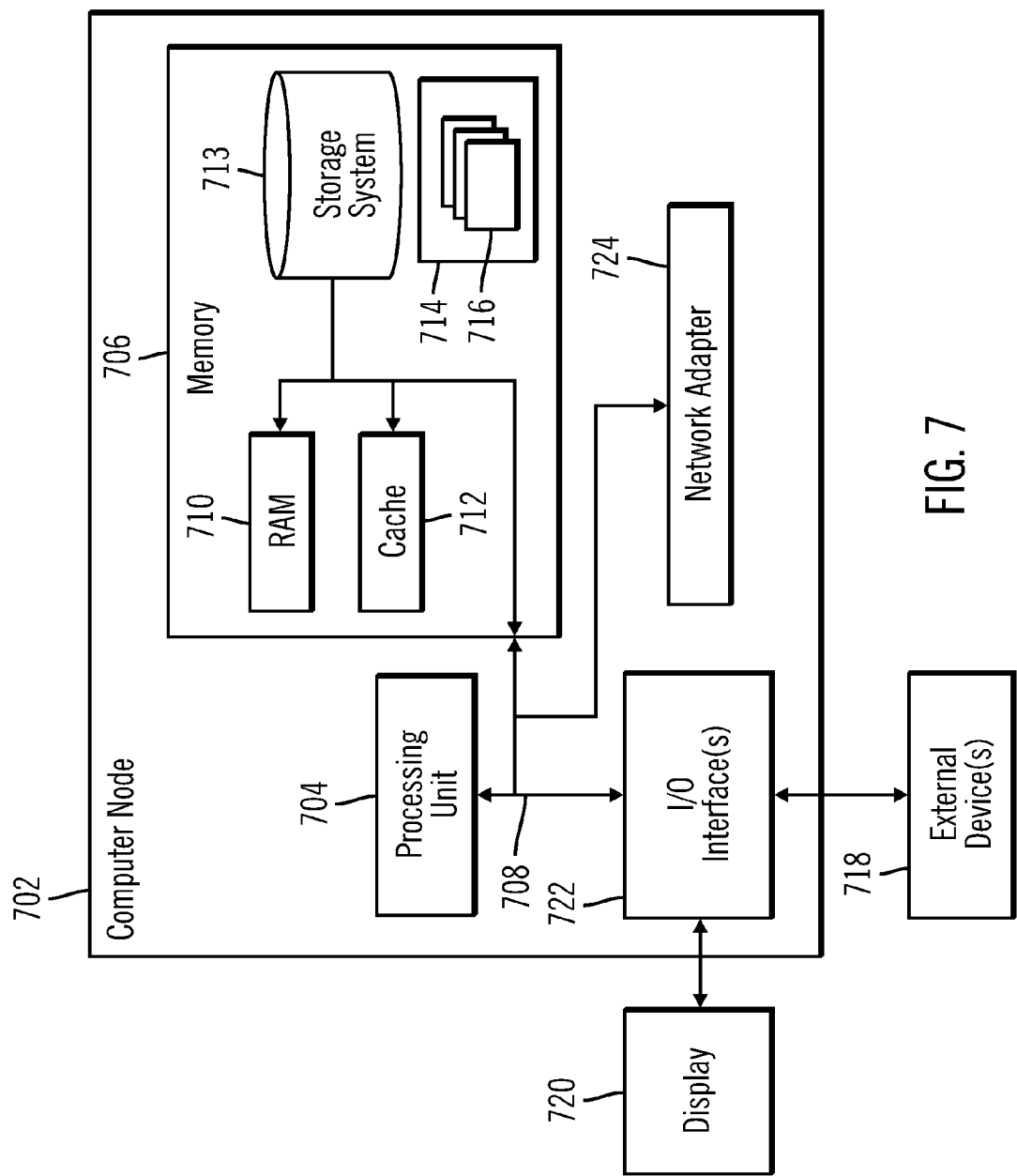
FIG. 7 illustrates a computing environment in which the components of FIG. 1 may be implemented.

The computational components of the computing environment 100, such as the VM environments 102a, 102b, backup manager 120, virtual disks 108a, 108b and portions thereof may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components may be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for storing data from virtual disks, wherein the computer program product comprises at least one computer readable storage medium including program instructions, wherein the program instructions when executed by a processor cause operations, the operations comprising:

storing data for a first virtual disk that represents data in a first format and metadata for the first virtual disk in a common data format in a storage, wherein the common data format stores blocks of data having a fixed block length;

processing a virtual disk file representing a second virtual disk, wherein the virtual disk file represents data in a second format that allows variable size blocks, wherein the second format is different from the first format used to represent the data for the first virtual disk and different from the common data format;

reading multiple instances of the fixed block length of blocks of data for the second virtual disk indicated in the virtual disk file;

for each instance of the fixed block length of blocks read, writing the instance of the read fixed block length of blocks to the storage in the common data format with metadata describing the second format of the blocks in the second virtual disk; and restoring the blocks in the common data format in the storage stored from the second virtual disk to a third virtual disk in the first or second format.

2. The computer program product of claim 1, wherein the restoring comprises:

processing the blocks in the common data format and the metadata from the second virtual disk to restore the blocks into a third virtual disk in the first format.

3. The computer program product of claim 1, wherein the restoring comprises:

processing the blocks in the common data format and the metadata from the second virtual disk to restore the blocks into a third virtual disk in the second format; and generating a new virtual disk file providing information on the data blocks of the third virtual disk.

4. The computer program product of claim 1, wherein the virtual disk file comprises a parent virtual disk file having information on all data in the second virtual disk as of an initial point-in-time, and wherein the operations further comprise:

processing a child virtual disk file in the second format having data for the second virtual disk as of an incremental point-in-time following the initial point-in-time;

wherein the reading of each instance of the fixed block length of blocks comprises: determining whether the child virtual disk file has changed data for any of the blocks to read in the second virtual disk for the instance of the fixed block length of blocks between an initial and incremental point-in-times;

reading the fixed block length of blocks as indicated in the parent virtual disk file in response to determining that the child virtual disk file does not provide blocks for the fixed block length of blocks to read; and reading the fixed block length of blocks as indicated in the child virtual disk file and as indicated in the parent virtual disk file for blocks of the instance of the fixed block length of blocks not indicated in the child virtual disk file.

5. The computer program product of claim 4, wherein the operations further comprise:

processing the metadata and the blocks in the common data format stored to restore the blocks in the storage stored in the common data format to a third virtual disk; and generating a new virtual disk file indicating the data in the third virtual disk in the second format.

6. The computer program product of claim 1, wherein the virtual disk file comprises a parent virtual disk file having information on all data in the first virtual disk as of an initial point-in-time, and wherein the operations further comprise:

processing a plurality of child virtual disk files in the second format having data for the second virtual disk represented by the parent virtual disk file at different incremental point-in-times;

wherein the reading of each instance of the fixed block length of blocks comprises:

determining whether at least one of the child virtual disk files has changed data for any of the blocks to read in the second virtual disk for the fixed block length of blocks between an initial and incremental point-in-times;

reading the fixed block length of blocks as indicated in the parent virtual disk file in response to determining that the child virtual disk files do not provide blocks for the fixed block length of blocks to read; and reading the fixed block length of blocks as indicated in the child virtual disk file providing data as of a most recent point-in-time and as indicated in the parent virtual disk file that are not indicated in one of the child virtual disk files.

7. The computer program product of claim 6, wherein the reads to the blocks indicated in the parent and child virtual disk files to access the data blocks to write to the storage in the common data format are for a fixed length of data used in the common data format, and wherein the blocks for one block in the common data format are read from data blocks represented in the parent virtual disk file and the child virtual disk file when the child virtual disk file indicates changed data for a portion of the block in the common data format.

8. The computer program product of claim 1, wherein the fixed block length in the common data format has a different length than the variable size blocks identified in the virtual disk file.

9. The computer program product of claim 1, wherein the first and second virtual disks in the first and second formats, respectively, are used by different first and second hypervisors implementing virtual machines.

10. The computer program product of claim 1, wherein the operations further comprise:

mounting the second virtual disk represented by the virtual disk file, wherein the reads are performed against the mounted second virtual disk and written to the storage in the common data format.

11. A system for storing data from virtual disks including a first virtual disk and a second virtual disk, comprising:

a processor; and at least one computer readable storage medium including program instructions that when executed by the processor to cause operations, the operations comprising:

storing data for the first virtual disk that represents data in a first format and metadata for the first virtual disk in a common data format in a storage, wherein the common data format stores blocks of data having a fixed block length;

processing a virtual disk file representing the second virtual disk, wherein the virtual disk file represents data in a second format that allows variable size blocks, wherein the second format is different from the first format used to represent the data for the first virtual disk and different from the common data format;

reading multiple instances of the fixed block length of blocks of data for the second virtual disk indicated in the virtual disk file;

for each instance of the fixed block length of blocks read, writing the instance of the read fixed block length of blocks to the storage in the common data format with metadata describing the second format of the blocks in the second virtual disk; and
restoring the blocks in the common data format in the storage stored from the second virtual disk to a third virtual disk in the first or second format.

12. The system of claim 11, wherein the restoring comprises:
processing the blocks in the common data format and the metadata from the second virtual disk file to restore the blocks into a third virtual disk in the second format; and
generating a new virtual disk file providing information on the data blocks of the third virtual disk.

13. The system of claim 11, wherein the virtual disk file comprises a parent virtual disk file having information on all data in the second virtual disk as of an initial point-in-time, and wherein the operations further comprise:
processing a child virtual disk file in the second format having data for the second virtual disk as of an incremental point-in-time following the initial point-in-time;
wherein the reading of each instance of the fixed block length of blocks comprises:
determining whether the child virtual disk file has changed data for any of the blocks to read in the second virtual disk for the instance of the fixed block length of blocks between an initial and incremental point-in-times;
reading the fixed block length of blocks as indicated in the parent virtual disk file in response to determining that the child virtual disk file does not provide blocks for the fixed block length of blocks to read; and
reading the fixed block length of blocks as indicated in the child virtual disk file and as indicated in the parent virtual disk file for blocks of the instance of the fixed block length of blocks not indicated in the child virtual disk file.

14. The system of claim 11, wherein the virtual disk file comprises a parent virtual disk file having information on all data in the first virtual disk as of an initial point-in-time, and wherein the operations further comprise:
processing a plurality of child virtual disk files in the second format having data for the second virtual disk represented by the parent virtual disk file at different incremental point-in-times;
wherein the reading of each instance of the fixed block length of blocks comprises:
determining whether at least one of the child virtual disk files has changed data for any of the blocks to read in the second virtual disk for the fixed block length of blocks between an initial and incremental point-in-times;
reading the fixed block length of blocks as indicated in the parent virtual disk file in response to determining that the child virtual disk files do not provide blocks for the fixed block length of blocks to read; and
reading the fixed block length of blocks as indicated in the child virtual disk file providing data as of a most recent point-in-time and as indicated in the parent virtual disk file that are not indicated in one of the child virtual disk files.

15. The system of claim 14, wherein the reads to the blocks indicated in the parent and child virtual disk files to access the blocks to write to the storage in the common data format are for a fixed length of data used in the common data format, and wherein the data blocks for one block in the common data format are read from blocks represented in the parent virtual disk file and the child virtual disk file when the child virtual disk file indicates changed data for a portion of the data blocks in the common data format.

16. The system of claim 11, wherein the first and second virtual disks in the first and second formats, respectively, are used by different first and second hypervisors implementing virtual machines.

17. A method for storing data from virtual disks, comprising:
storing data for a first virtual disk that represents data in a first format and metadata for the first virtual disk in a common data format in a storage, wherein the common data format stores blocks of data having a fixed block length;
processing a virtual disk file representing a second virtual disk, wherein the virtual disk file represents data in a second format that allows variable size blocks, wherein the second format is different from the first format used to represent the data for the first virtual disk and different from the common data format;
reading multiple instances of the fixed block length of blocks of data for the second virtual disk indicated in the virtual disk file;
for each instance of the fixed block length of blocks read, writing the instance of the read fixed block length of blocks to the storage in the common data format with metadata describing the second format of the blocks in the second virtual disk; and
restoring the blocks in the common data format in the storage stored from the second virtual disk to a third virtual disk in the first or second format.

18. The method of claim 17, wherein the restoring comprises:
processing the blocks in the common data format and the metadata from the second virtual disk to restore the blocks into a third virtual disk in the second format; and
generating a new virtual disk file providing information on the blocks of the third virtual disk.

19. The method of claim 17, wherein the virtual disk file comprises a parent virtual disk file having information on all data in the second virtual disk as of an initial point-in-time, further comprising:
processing a child virtual disk file in the second format having data for the second virtual disk as of an incremental point-in-time following the initial point-in-time;
wherein the reading of each instance of the fixed block length of blocks comprises:
determining whether the child virtual disk file has changed data for any of the blocks to read in the second virtual disk for the instance of the fixed block length of blocks between an initial and incremental point-in-times;
reading the fixed block length of blocks as indicated in the parent virtual disk file in response to determining that the child virtual disk file does not provide blocks for the fixed block length of blocks to read; and
reading the fixed block length of blocks as indicated in the child virtual disk file and as indicated in the parent virtual disk file for blocks of the instance of the fixed block length of blocks not indicated in the child virtual disk file.

20. The method of claim 17, wherein the virtual disk file comprises a parent virtual disk file having information on all data in the first virtual disk as of an initial point-in-time, further comprising:
processing a plurality of child virtual disk files in the second format having data for the second virtual disk represented by the parent virtual disk file at different incremental point-in-times;

wherein the reading of each instance of the fixed block length of blocks comprises:

determining whether at least one of the child virtual disk files has changed data for any of the blocks to read in the second virtual disk for the fixed block length of blocks between an initial and incremental point-in-times;

reading the fixed block length of blocks as indicated in the parent virtual disk file in response to determining that the child virtual disk files do not provide blocks for the fixed block length of blocks to read; and reading the fixed block length of blocks as indicated in the child virtual disk file providing data as of a most recent point-in-time and as indicated in the parent virtual disk file that are not indicated in one of the child virtual disk files.

21. The method of claim 20, wherein the reads to the blocks indicated in the parent and child virtual disk files to access the blocks to write to the storage in the common data format are for a fixed length of data used in the common data format, and wherein the blocks for one block in the common data format are read from data blocks represented in the parent virtual disk file and the child virtual disk file when the child virtual disk file indicates changed data for a portion of the data block in the common data format.

22. The method of claim 17, wherein the first and second virtual disks in the first and second formats, respectively, are used by different first and second hypervisors implementing virtual machines.

\* \* \* \* \*